(12) United States Patent
Gowda et al.

(10) Patent No.: US 6,529,340 B2
(45) Date of Patent: Mar. 4, 2003

(54) ASYMMETRY CORRECTION CIRCUIT

(75) Inventors: Sudhir M. Gowda, Briarcliff Manor, NY (US); Scott K. Reynolds, Granite Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/753,316

(22) Filed: Dec. 29, 2000

(65) Prior Publication Data

US 2002/0118438 A1 Aug. 29, 2002

(51) Int. Cl.$^7$ .............................................. G11B 5/02
(52) U.S. Cl. ............................. 360/25; 360/53; 360/46; 360/67
(58) Field of Search ............................ 360/25, 53, 46, 360/67

(56) References Cited

U.S. PATENT DOCUMENTS 5,418,660 A * 5/1995 Sato et al. .................... 360/65
6,043,943 A * 3/2000 Rezzi et al. .................. 360/67
6,147,828 A * 11/2000 Bloodworth et al. ......... 360/67

* cited by examiner

*Primary Examiner*—Alan T. Faber
(74) *Attorney, Agent, or Firm*—Ference & Associates

(57) ABSTRACT

A technique for converting asymmetric waveforms into symmetric ones. The technique is used in disk drive read channels which receive asymmetric waveforms from magnetoresistive heads. Conversion of these waveforms into symmetric ones results in improved bit error rate of the read channel. The correction technique can be used for any general asymmetry transfer function, and in any general application where the correction of asymmetric waveforms is needed. The technique involves splitting the input signal into two rectified paths and applying correction independently on each of the paths.

18 Claims, 3 Drawing Sheets

ASYMMETRY CORRECTION CIRCUIT

FIELD OF THE INVENTION

The present invention relates generally to circuitry used to correct asymmetric waveforms, such as those in disk drive signals, into symmetric waveforms.

BACKGROUND OF THE INVENTION

The resistance of the sensing layer in a magnetoresistive (MR) head varies with the field in the vicinity of the heads. This feature is used to read data from magnetic disk drives. Ideally, the resistance of the sensing layer is a linear function of its magnetic orientation. In practice, however, the output of the MR head is asymmetric, owing to an offset in the biasing of the head. The percentage of asymmetry is defined as:

$$\text{percentage asymmetry} = \frac{|\text{max peak}| - |\text{min peak}|}{|\text{max peak}|} \times 100$$

Asymmetry could also be defined as:

$$\text{percentage asymmetry} = \frac{|\text{max peak}| - |\text{min peak}|}{(|\text{max peak}| + |\text{min peak}|)/2} \times 100$$

Both the above definitions of asymmetry provide a quantitative way of expressing the degree of asymmetry in the waveform. The waveforms could be asymmetric with either polarity. The waveform is considered to be positively asymmetric if the positive side of the waveform has a higher peak than the negative side of the waveform. A waveform distorted in the opposite direction is considered negatively asymmetric. The asymmetric waveforms result in a high bit error rate (BER) being generated in the read channel electronics that process the signal from the MR head and extract data from this signal.

U.S. Pat. No. 6,043,943, entitled "Asymmetry correction for a read head," (F. Rezzi, G. Patti, ST Microelectronics Inc., issued on Mar. 28, 2000), discloses an arrangement in which, in the context of correcting asymmetric waveforms, essentially one correction function is applied to both sides of a waveform. This often results in sub-optimal correction of the asymmetry at hand.

In view of the foregoing, a need has been recognized in connection with optimally converting asymmetric waveforms into symmetric waveforms in signal processing circuits or other environments in which such conversion would be appropriate or desirable.

SUMMARY OF THE INVENTION

In accordance with at least one presently preferred embodiment of the present invention, asymmetric waveforms are converted into symmetric waveforms via splitting the input signal into two rectified paths and applying correction independently on each of the paths.

In summary, one aspect of the invention provides an apparatus for correcting asymmetric waveforms, the apparatus comprising: an input arrangement which accepts an input signal, the input signal having an associated waveform; a splitting arrangement which splits the input signal into at least two paths; a first altering arrangement, associated with a first of the two signal paths, which alters a first portion of the split signal; a second altering arrangement, associated with a second of the two signal paths, which alters a second portion of the split signal; and an output arrangement which recombines the altered split signals into an output signal; whereby the output signal exhibits a substantially symmetric waveform.

Another aspect of the invention provides a method of correcting asymmetric waveforms, the method comprising the steps of: accepting an input signal, the input signal having an associated waveform; splitting the input signal into at least two portions; altering a first portion of the split signal; altering a second portion of the split signal; and recombining the altered split signals into an output signal; whereby the output signal exhibits a substantially symmetric waveform.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Generally, the signal at the output of an MR head is asymmetric, due to commonly exhibited encountered characteristics as observed in practice. This signal is amplified in the arm electronics of the disk drive system, and then goes to the read channel electronics.

Figure 1:
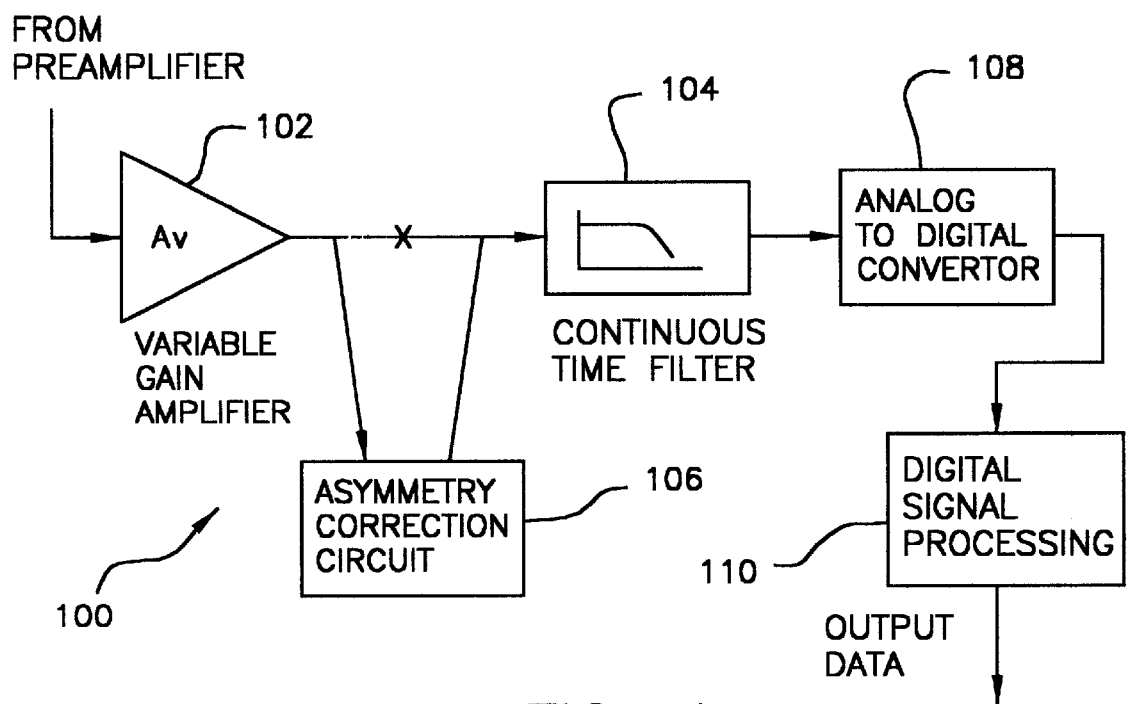
FIG. 1 is a block diagram of a read channel circuit in a hard disk drive, showing the location of an asymmetry correction circuit.

A simplified block diagram of a read channel circuit 100 is shown in FIG. 1. The first stage in the read channel is a variable gain amplifier (VGA) 102, which is then typically followed by a continuous time filter (CTF) 104. In accordance with a preferred embodiment of the present invention, in order to correct the asymmetric waveform into a symmetric one, an asymmetry correction circuit 106 is inserted in the signal path between the VGA 102 and CTF 104. The remainder of the circuit, which could include an analog-to-digital converter (ADC) 108 and some digital signal processing 110, need not necessarily be changed.

Figure 2:
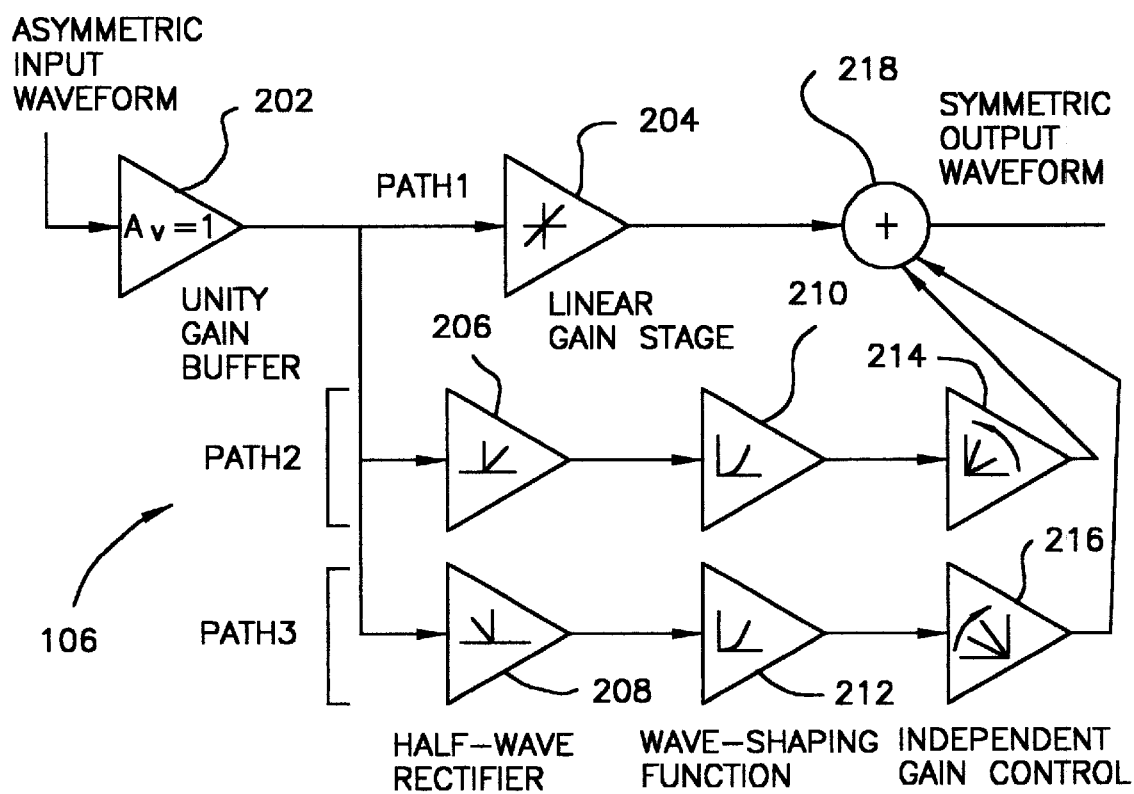
FIG. 2 is a block diagram showing an asymmetry correction technique.

A block diagram of an asymmetry correction circuit 106, in accordance with an embodiment of the present invention, is shown in FIG. 2. There can be a unity gain buffer 202 at the input, in order to present minimal loading to the output of the VGA (102 in FIG. 1). At the output of the buffer 202, the signal is preferably split into three paths, PATH1, PATH2 and PATH3. PATH1 goes through a linear gain stage 204. The purpose of this path is to provide the same delay to the signal as in the other two paths. The gain associated with PATH1 is preferably selected based on the gain requirements of the entire asymmetry correction circuit.

PATH2 and PATH3 are similar, but not identical. Each of them preferably has a half-wave rectifier (206, 208), followed by a wave-shaping circuit (210, 212), followed by a programmable gain stage (214, 216). PATH2 operates on the positive side of the input waveform, while PATH3 operates on the negative side of the input waveform. The rectifiers in PATH1 and PATH2 therefore produce a rectified version of the two asymmetric halves of the input waveform.

Each of these signals (in PATH2 and PATH3) goes through a different wave- shaping block. The transfer function of the wave-shaping blocks 210/212 will depend on the transfer function of the asymmetry. For a piecewise linear asymmetry transfer function, the wave-shaping circuits 210/212 have linear gain. For square-law or sinusoidal asymmetry transfer functions, the wave-shaping circuit 210/212 will have the appropriate transfer function to generate the correction term for each half of the input waveform. The two independently programmable gain stages in the two paths are also intended to give greater flexibility for the correction of high percentages of asymmetry.

The three paths, PATH1, PATH2 and PATH3 are preferably configured in such a way that the signal has identical delay going through any one of the paths. The signals at the outputs of the three paths are then added (at 218) to produce the output waveform of the asymmetry correction circuit. This output waveform is a symmetric one, which then goes to the next stage in the read channel which is the CTF circuit (104 in FIG. 1).

Figure 3:
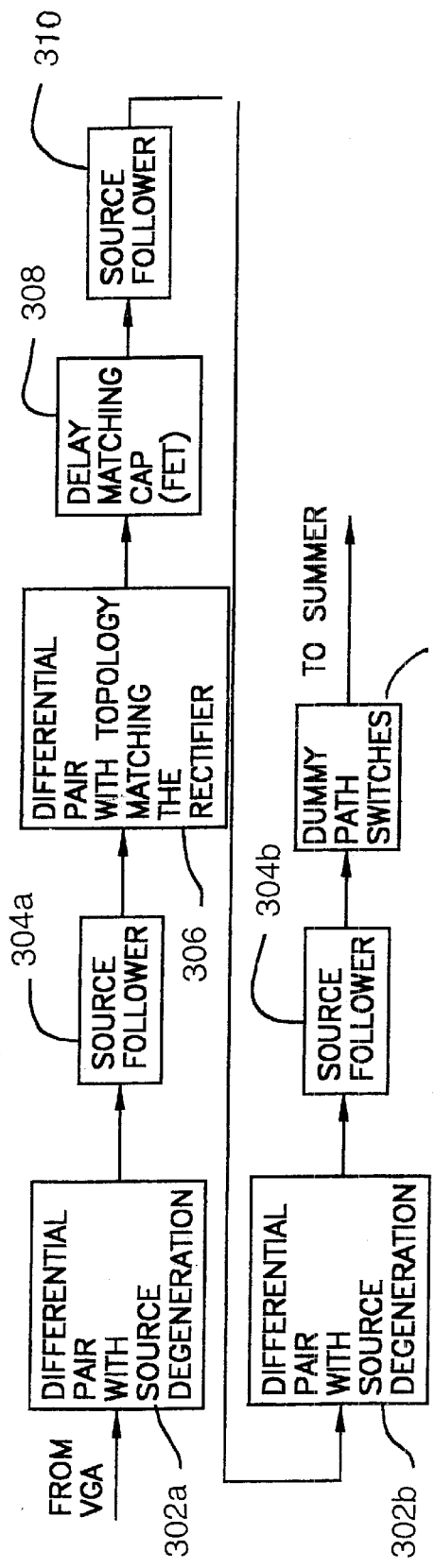
FIG. 3 is a block diagram of the signal path with linear gain.

A block diagram of PATH1, the path with linear gain stage 204, is shown in FIG. 3. The gain associated with this path is preferably configured so that the total gain through the asymmetry correction circuit after adding the outputs of PATH1, PATH2 and PATH3 meets the gain requirements of the system. PATH1, as such, preferably includes gain stages, buffers between the stages, and delay stages. In a preferred embodiment, the gain stages include source-coupled field effect transistor (FET) differential pairs with source degeneration (indicated at 302a and 302b). These could also be designed with emitter-coupled bipolar junction transistor (BJT) devices. Also, in a preferred embodiment, the buffers between the stages are implemented as FET's connected as source followers (304a and 304b).

The delay of PATH1 is preferably made very similar to PATH2 and PATH3 by using a similar number of circuit stages in PATH1 as are used in PATH2 and PATH3. The circuit stages are also preferably made similar between the different paths, to the extent possible by the functional requirements of the circuits. In a preferred embodiment, a differential pair (306) with a topology matching the rectifier circuits in PATHS 2/3 is added to PATH1. The purpose of this matched differential pair is to match the delay of PATH1 with those in PATHS 2/3. Any further mismatch in delay can be compensated for by adding a delay stage. The delay stage could be implemented with a simple circuit, such as capacitive loading on the nodes in the signal path, as is done in the "delay matching cap" block 308 of FIG. 3. In a preferred embodiment, the capacitive loading is provided by an FET gate capacitor. An additional source follower 310 may preferably be added subsequent to the delay stage at 308. The delay stage could also be added to PATH2 and PATH3, if the delay in these paths is less than that of PATH1. As shown, dummy path switches 312 may be provided subsequent to source follower 304b.

Figure 4:
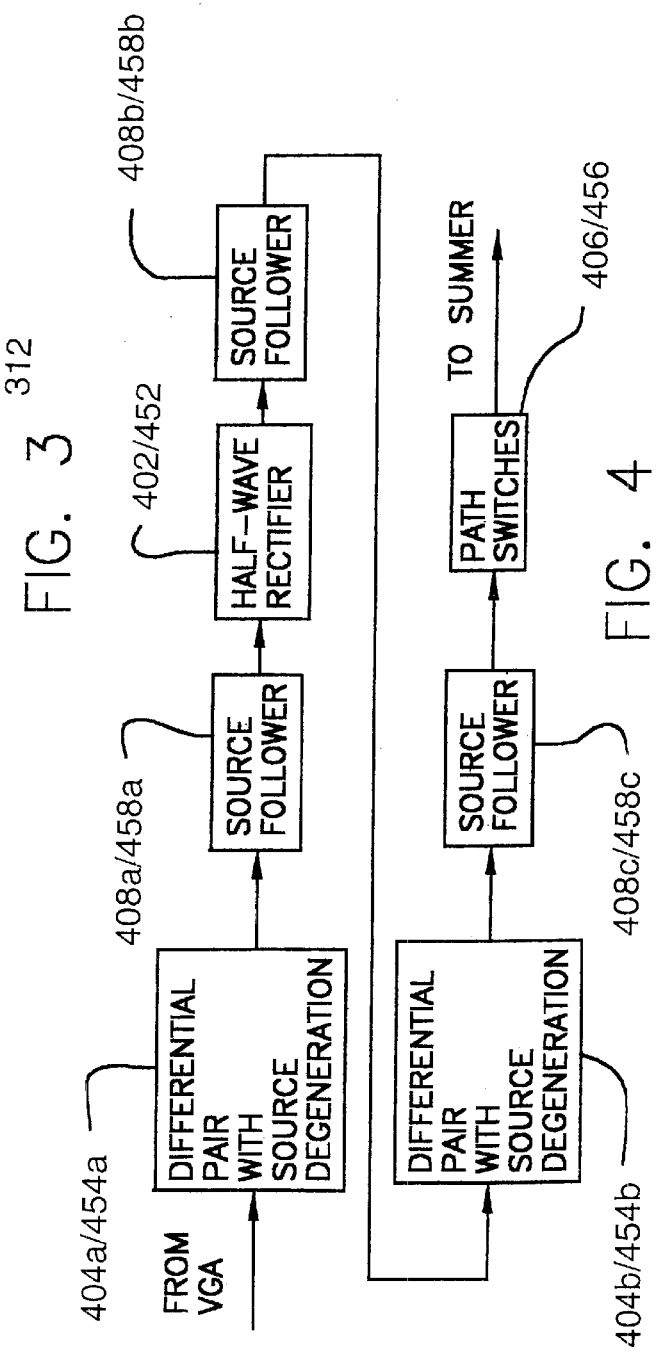
FIG. 4 is a block diagram of the signal path with a rectifier.

A block diagram illustrating the composition of PATH2 (also applicable to PATH3) is shown in FIG. 4. The paired reference numerals provided in FIG. 4 relate, respectively, to PATH2 and PATH3. Each path preferably includes a half-wave rectifier stage 402 in order to extract one or other half of the asymmetric waveform. In a preferred embodiment of the present invention, the rectifier used is that described in the copending and commonly assigned U.S. patent application Ser. No. 09/753,311 entitled "MOSFET Rectifier Circuit with Operational Amplifier Feedback".

As shown in FIG. 4, in a preferred embodiment, the wave shaping function (indicated at 210/212 in FIG. 2) is implemented within the transfer characteristics of differential pairs with source degeneration 404a/454a and 404b/454b, as well as the half-wave rectifier 402/452. This wave-shaping function is optimized based on the asymmetry transfer function that is exhibited by the MR head. In addition, the two differential pairs with source degeneration (402/.452) shown in FIG. 4 provide additional flexibility to adjust the gain depending on design requirements. The two paths also preferably have a programmable gain stage, which is implemented as part of the summing stage (indicated at 218 in FIG. 2) where PATH1, PATH2 and PATH3 end. Note that each of these two paths, PATH2 and PATH3, has its own wave-shaping function, and that the gains in the two paths are independently programmable. PATH2 and PATH3 also preferably contain switches 406/456 which are used to direct the signals in order to correct for opposite polarities of asymmetry. As shown, source followers 408a/458a, 408b/458b and 408c/458c may also preferably be provided in PATH2 and PATH3 to serve similar purposes as described heretofore in connection with PATH1 (FIG. 3).

Figure 5:
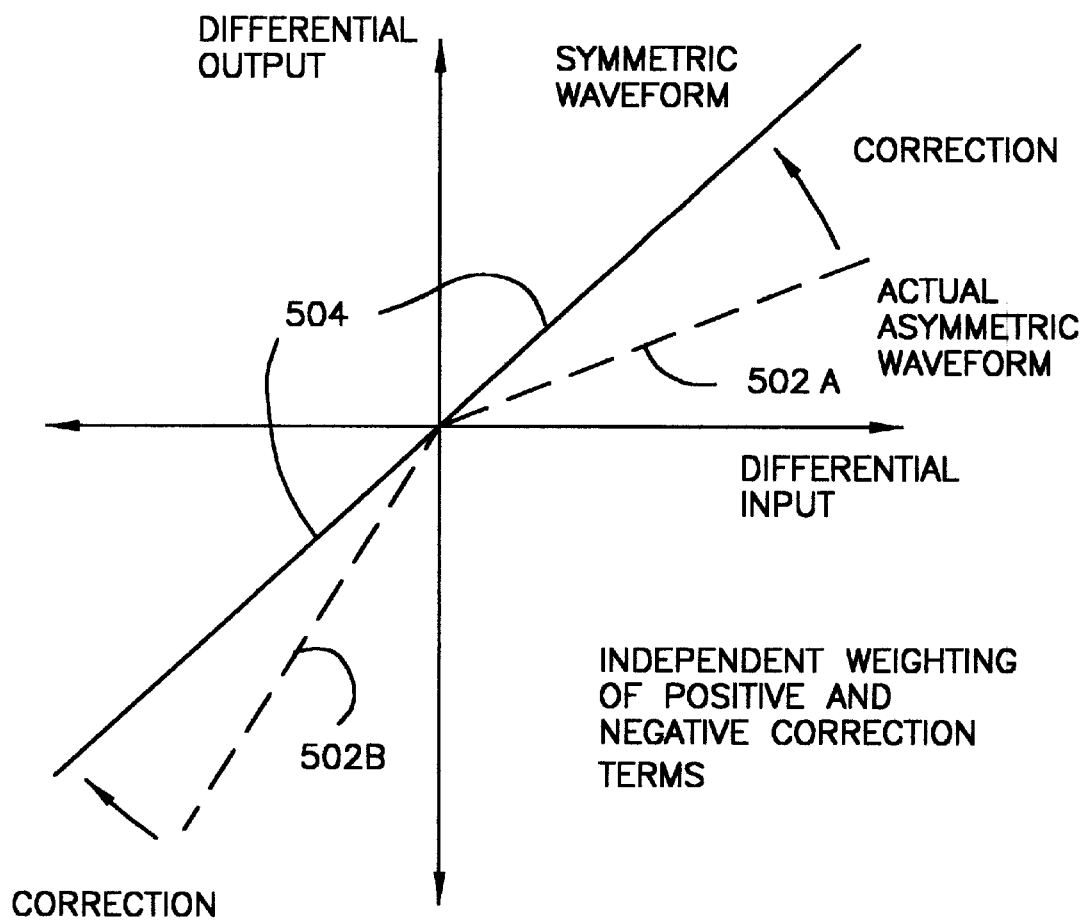
FIG. 5 illustrates a DC transfer function showing the asymmetric and symmetric waveforms.

A DC transfer curve is shown in FIG. 5. The dashed lines 502a and 502b indicate the input to the asymmetric correction circuit, which is an asymmetric waveform with different linear gains on either side of the origin. After the input waveform goes through the asymmetry correction circuit and correction has been applied independently to the two halves of the signals coming out of the half-wave rectifiers, the symmetric output signal (indicated by line 504) is produced.

A more detailed explanation of the working of an asymmetry correction circuit in accordance with a preferred embodiment of the present invention follows.

Consider a symmetric signal with a period T, written as a function of time (t):

$A(t)=|x(t)|$ for $0<t<T/2$ and $A(t)=-|x(t)|$ for $T/2<t<T$, where $x(t)=0$ at $t=0, T/2, T$ Assume that there are distorting functions, f1(x) and f2(x) for positive and negative x, respectively. f1(x) and f2(x) could be any form of distortion, including linear, square wave, sine wave, etc. The asymmetric signal entering the correction circuit described here is of the form:

$B(t)=|x(t)|+f1(x(t))$ for $0<t<T/2$ and $B(t)=-|x(t)|-f2(x(t))$ for $T/2<t<T$

Let it also be assumed that the rectifiers are configured in such a manner that PATH2 extracts the positive half of the input waveform and PATH3 extracts the negative half of the input waveform. In that case, the correction functions and gains built into PATH2 and PATH3 result in correction terms P2(t) and P3(t) respectively, such that:

$A(t)=G \times B(t)+P2(t)$ for $02t<T/2$ and $A(t)=G \times B(t)+P3(t)$ for $T/2<t<T$ where G is the gain of the linear gain stage shown in PATH1 of FIG. 2.

Hence, the output of the asymmetry correction circuit is the original symmetric signal, A(t).

It is to be understood that the embodiments of the present invention, as described and illustrated herein, need not necessarily be employed solely in the environment of disk drive systems. Indeed, it is contemplated that the embodiments of the present invention may be employed in essentially any environment in which asymmetric waveforms are to be corrected.

If not otherwise stated herein it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for correcting asymmetric waveforms, said apparatus comprising:

an input arrangement which accepts an input signal, the input signal having an associated waveform;

a splitting arrangement which splits the input signal into at least two paths;

a first altering arrangement, associated with a first of said two signal paths, which alters a first portion of the split signal;

a second altering arrangement, associated with a second of said two signal paths, which alters a second portion of the split signal; and an output arrangement which recombines the altered split signals into an output signal;

whereby the output signal exhibits a substantially symmetric waveform;

said splitting arrangement further being adapted to split the input signal into a third signal path;

said apparatus further comprising a delaying arrangement, associated with the third signal path, which applies a delay to a third portion of the split signal.

2. The apparatus according to claim 1, wherein said input arrangement is adapted to accept an input signal having an asymmetric waveform.

3. The apparatus according to claim 1, wherein said first altering arrangement comprises a first wave-shaping block which alters a waveform associated with the first portion of the split signal.

4. The apparatus according to claim 3, wherein said first altering arrangement comprises a second wave-shaping block which alters a waveform associated with the second portion of the split signal.

5. The apparatus according to claim 1, wherein said first altering arrangement comprises a first half-wave rectifier which initially rectifies a waveform associated with the first portion of the split signal.

6. The apparatus according to claim 5, wherein said second altering arrangement comprises a second half-wave rectifier which initially rectifies a waveform associated with the second portion of the split signal.

7. The apparatus according to claim 1, wherein the first portion of the split signal is a positive portion of the split signal and the second portion of the split signal is a negative portion of the split signal.

8. The apparatus according to claim 1, wherein said delaying arrangement is adapted to apply a delay to the third signal portion similar to a delay associated with the first and second signal portions.

9. The apparatus according to claim 1, wherein said delaying arrangement comprises a linear gain stage.

10. A method of correcting asymmetric waveforms, said method comprising the steps of:

accepting an input signal, the input signal having an associated waveform;

splitting the input signal into at least two portions;

altering a first portion of the split signal;

altering a second portion of the split signal; and recombining the altered split signals into an output signal;

whereby the output signal exhibits a substantially symmetric waveform;

said splitting step further comprising splitting the input signal into a third portion;

said method further comprising the step of delaying the third portion of the split signal.

11. The method according to claim 10, wherein said accepting step comprises accepting an input signal having an asymmetric waveform.

12. The method according to claim 10, wherein said step of altering a first portion of the split signal comprises altering a waveform associated with the first portion of the split signal.

13. The method according to claim 12, wherein said said step of altering a second portion of the split signal comprises altering a waveform associated with the second portion of the split signal.

14. The method according to claim 10, wherein said step of altering the first portion of the split signal comprises initially rectifying a waveform associated with the first portion of the split signal.

15. The method according to claim 14, wherein said step of altering the second portion of the split signal comprises initially rectifying a waveform associated with the second portion of the split signal.

16. The method according to claim 10, wherein the first portion of the split signal is a positive portion of the split signal and the second portion of the split signal is a negative portion of the split signal.

17. The method according to claim 10, wherein said delaying step comprises applying a delay to the third signal portion similar to a delay associated with the first and second signal portions.

18. The method according to claim 10, wherein said delaying step comprises employing a linear gain stage.

* * * * *